June 22, 1937.　　　B. S. AIKMAN　　　2,084,666
MAGNETIC TRUCK BRAKE
Filed Oct. 14, 1936
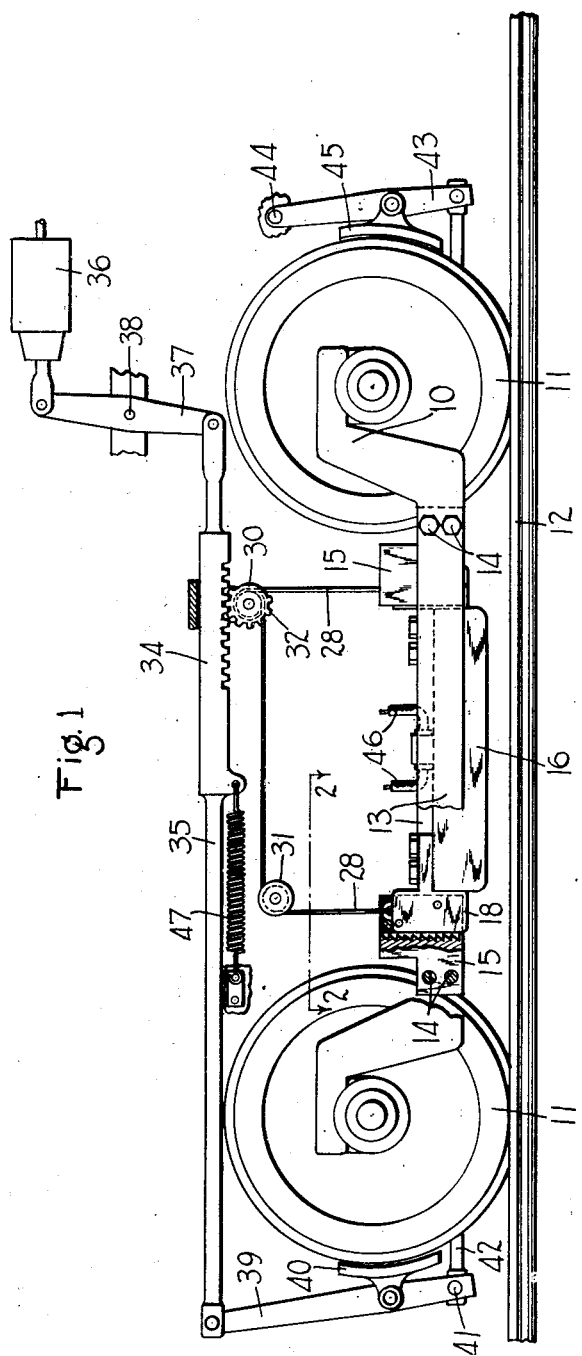
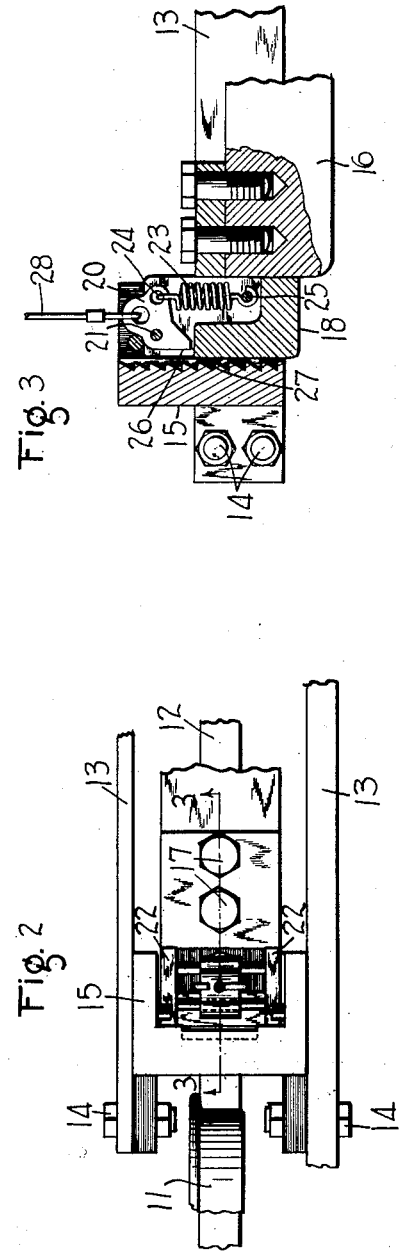
INVENTOR
BURTON S. AIKMAN.
BY  Wm. M. Cady
ATTORNEY Patented June 22, 1937

2,084,666

UNITED STATES PATENT OFFICE 2,084,666

MAGNETIC TRACK BRAKE

Burton S. Aikman, Wilkinsburg, Pa., assignor to The Westinghouse Air Brake Company, Wilmerding, Pa., a corporation of Pennsylvania Application October 14, 1936, Serial No. 105,468

8 Claims. (Cl. 188—165)

This invention relates to magnetic track brakes, and more particularly to magnetic track brakes for railway vehicles.

Where magnetic track brakes are employed as supplementary to the standard fluid pressure brakes on railway vehicles, it is often preferred that the magnetic track brake devices be mechanically lowered to engagement with the track rail, and mechanically raised from engagement with the track rail, as a direct result of the application and release, respectively, of the fluid pressure brakes. This is particularly desirable, and often times the only practical solution, in cases where magnetic track brakes are to be installed on an old vehicle already equipped with standard fluid pressure brakes.

It is a principal object of the present invention to provide a magnetic track brake construction in which the magnetic track brake devices are lowered to engagement with the track rail in direct response to an application of a standard fluid pressure brake system, and are raised from engagement with the track rail in direct response to the release of the fluid pressure brakes.

A further object of the present invention is to provide a magnetic track brake system of the character aforesaid, in which means is provided for locking the track brake devices in their raised position upon a failure of the lowering and raising mechanism at a time when the track brake devices are suspended above a track rail.

Further objects and advantages of the invention, dealing with specific constructions and arrangements of parts, will be understood from the following description, which is taken in connection with the attached drawing, wherein, Fig. 1 shows in diagrammatic form an embodiment of the invention in connection with a standard air brake system.

Fig. 2 is a fragmentary view taken along the line 2—2 of Fig. 1.

Fig. 3 is a fragmentary sectional view taken along the line 3—3 of Fig. 2.

Referring now to the drawing, I have indicated a vehicle truck at 10 as being supported on wheels 11 rolling upon a track rail 12. The truck 10 comprises side frame member 13 having bolted thereto by bolts 14 two guide members 15. Disposed between these two guide members is a magnetic track brake device 16, here understood to be of conventional design. At each end of the magnetic track brake device 16 is secured by bolts 17 a bracket 18.

The bracket 18 has a channel shaped portion within which is a latch 20, pivotally mounted on a pin 21 carried by the side walls 22 of the bracket 18. The latch 20 is urged to rotate in a clockwise direction by a spring 23, which has one end thereof connected to an eye 24 in the latch, and the other end thereof to a pin 25. When the latch 20 is permitted to rotate in a clockwise direction a pawl 26 forming a part thereof will engage teeth 27 formed in the bracket 15. When this takes place the track shoe device 16 cannot be lowered below the position attained at the time the pawl 26 engages the teeth 27.

The track brake device 16 is lowered and raised by cables 28, each of which is attached at one end to a latch 20 and at the other end to a windlass 30, one of the cables passing over a pulley 31. The windlass 30 is provided with a gear 32 adapted to mesh with a rack 34 secured to, or formed integral with, a lever 35 forming a part of a conventional air brake system.

The air brake system comprises a brake cylinder 36 having its piston connected to a lever 37, pivotally mounted to the car frame at 38. As shown, the lever 37 is connected to the rod 35 and may actuate it in response to operation of the brake cylinder 36, as will be now described.

In operation, when the air brakes are released the pressure in the brake cylinder 36 will be substantially at atmospheric pressure, and the parts will be in the positions as shown in Fig. 1, from whence it will be noted that the track brake device 16 is maintained suspended above the track rail 12 by virtue of the cables 28 being wound up on the windlass 30.

When fluid under pressure is supplied to the brake cylinder 36 to effect an application of the brakes, the lever 37 is rotated in a counterclockwise direction, thereby pulling the brake rod 35 to the right. As the brake rod 35 moves to the right it swings a connected lever 39 also to the right, pulling a brake shoe 40 up against the adjacent wheel 11. The brake shoe lever 39 fulcrums about its lower end 41, which is connected to a rod 42. The rod 42 extends longitudinally of the car and connects to a second brake shoe lever 43, which lever is pivotally connected to the car frame at 44 and carries a brake shoe 45. As will be obvious, the pull on the rod 35 will pull the aforementioned brake shoe 40 up tight against the left hand wheel 11, while the resulting pull on the brake rod 42 will pull the shoe 45 up against the right hand wheel 11.

The movement of the brake rod 35 to the right rotates the windlass 30 in a clockwise direction, to unwind the cables 28 and thereby lower the track brake device 16 to engagement with the rail 12. If now current is supplied to the track brake device by way of conductors 46, the track brake device will produce a braking effect, this braking effect being transmitted to the truck frame 10 by way of the guide members 15.

When fluid under pressure is released from the brake cylinder 13 to release the brakes, a spring 47 will pull the brake rod 35 to the left, thereby winding the cables 28 up on the windlass 30 and raising the track brake device 16 from engagement with the rail, it bing understood of course that when fluid under pressure is released from the brake cylinder 30 the supply of current to the track brake device is cut off.

If now while the track brake device 16 is in its raised position, one or both of the cables 28 should brake, or unintended slack should instantly develop in these cables, the spring 23 will rotate the latch 20 in a clockwise direction to cause the pawl 26 to engage the teeth 27, thereby preventing the force of gravity from causing the track brake device to drop to the rails. The vehicle then may be operated without the track brake devices dragging on the rails.

It will be understood, of course, that so long as tension is maintained on the cables 28 sufficient to hold the track shoe device raised the pull of the spring 23 will be overcome, so that the latch 20 will not engage the teeth 27. The latch therefore functions automatically in response to development of unintended slack in the cables 28 to maintain the track brake device in its raised position.

While I have described my invention with particular reference to a specific embodiment thereof, it is not my intention to be limited to the exact details of this embodiment, nor otherwise than by the spirit and scope of the appended claims.

Having now described my invention, what I claim as new and desire to secure by Letters Patent, is:

1. In a vehicle brake system, in combination, a fluid pressure brake system having a brake operating rod, a magnetic track brake device, a ratch associated with said rod and movable as said rod moves, and means controlled by the movement of said ratch for controlling the raising and lowering of said track brake device in accordance with the movement of said rod.

2. In a vehicle brake system, in combination, a fluid pressure brake system having a brake operating rod, a magnetic track brake device, a rotatable element, means for lowering said track brake device into engagement with the track rail when said rotatable element is rotated in one direction and for raising said track brake device from engagement with the track rail when rotated in the opposite direction, and means associated with said brake operating rod for rotating said rotatable member in accordance with the direction of movement of said rod.

3. In a vehicle brake system, in combination, a fluid pressure brake system having a brake operating rod, a ratch associated with said rod and movable as said rod moves, a windlass operated by said ratch, a magnetic track brake device, and means operated in accordance with the operation of said windlass for controlling the raising and lowering of said track brake device from and toward a track rail.

4. In a vehicle brake system, in combination, a fluid pressure brake system having a brake operating rod, a ratch associated with said rod and movable as said rod moves, a magnetic track brake device, cables connected to said magnetic track brake device for lowering said brake device toward engagement with the track rail and for raising said brake device from said rail, and a windlass connected to said cables and actuated by said ratch for raising and lowering said track brake device.

5. In a magnetic track brake device, in combination, a vehicle truck, a magnetic track brake device adapted to be suspended from said truck above a track rail, means for effecting lowering of said track brake device toward said rail and the raising of said device from said rail, and means automatically operable upon failure of said raising and lowering means at a time when said track brake device is in its raised position for maintaining said brake device in said raised position.

6. In a magnetic track brake system, in combination, a vehicle truck, a magnetic track brake device, means for suspending said track brake device from said truck above a track rail, said suspension means being operable to produce a constantly applied force to maintain said track brake device in said raised position, and means operable in response to a loss of said force for locking said track brake device in said raised position.

7. In a magnetic track brake system, in combination, a vehicle truck, a magnetic track brake device, means for suspending said magnetic track brake device from said vehicle truck over a track rail, and a latch on said track brake device associated with said suspension means and operable in response to a failure of said suspension means for locking said track brake device in its raised position.

8. In a magnetic track brake construction, in combination, a vehicle truck, a magnetic track brake device, a latch on said magnetic track brake device, an element on said truck adapted to be engaged by said latch when said track brake device is in a raised position to prevent lowering of said track brake device to engagement with a track rail, and suspension means connected to said latch and operable during normal conditions to maintain said latch out of engagement with said element on said truck, said latch being operable upon failure of said suspension means to engage said element on said truck.

BURTON S. AIKMAN.